Figure 1:
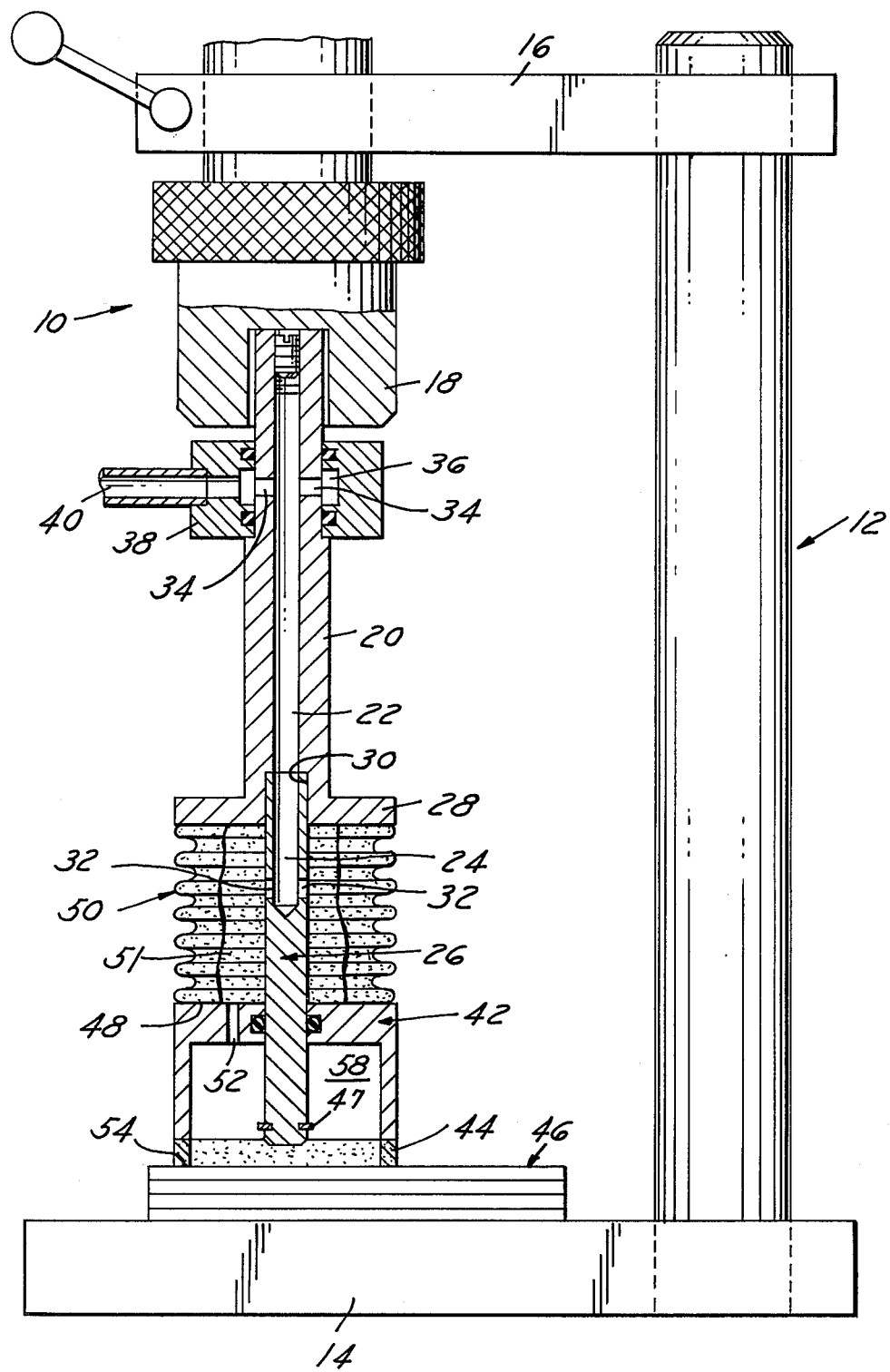

United States Patent [19]
Giardini

[11] 4,194,322
[45] Mar. 25, 1980

[54] CONSTANT FORCE SHEET GLASS CUTTING DRILL ASSEMBLY

[75] Inventor: Dante S. Giardini, Dearborn Heights, Mich.

[73] Assignee: Ford Motor Company, Dearborn, Mich.

[21] Appl. No.: 912,902

[22] Filed: Jun. 5, 1978

[51] Int. Cl.² .............................................. B32B 35/00
[52] U.S. Cl. .................................. 51/81 R; 51/111 R; 51/283 R; 125/20; 156/98; 156/513; 408/41
[58] Field of Search .......................... 30/164.95, 276; 51/81 R, 168, 111 R, 283 R, 34 J, 125; 125/20; 156/98, 513, 256, 293; 408/27, 37, 41, 118, 119, 145

[56] References Cited

U.S. PATENT DOCUMENTS

| | | | |
|---|---|---|---|
| 2,941,338 | 6/1960 | Santschi | 51/81 R |
| 3,007,686 | 11/1961 | Pearson | 125/20 X |
| 3,494,348 | 2/1970 | Lindblad | 125/20 |
| 3,568,367 | 3/1971 | Myers | 125/20 X |
| 3,813,820 | 6/1974 | Highberg et al. | 51/81 |
| 3,848,365 | 11/1974 | Bovensrepen et al. | 51/111 R |
| 4,073,094 | 2/1978 | Walz | 51/111 R |

*Primary Examiner*—Gary L. Smith
*Assistant Examiner*—Robert P. Olszewski
*Attorney, Agent, or Firm*—Robert E. McCollum; Clifford L. Sadler

[57] ABSTRACT

A portable lightweight drill assembly has a cutter mounted against a sheet of flat glass through which a hole is to be drilled; in an alternate embodiment, the drill shaft extends through a hole in the glass and has cutters mounted on both sides of the glass; in each case, the cutters are biased against the glass by a fluid pressure actuated bellows type servo constructed to exert a constant cutting force against the glass surface by means of a self-regulating action of the fluid pressure force.

14 Claims, 3 Drawing Figures

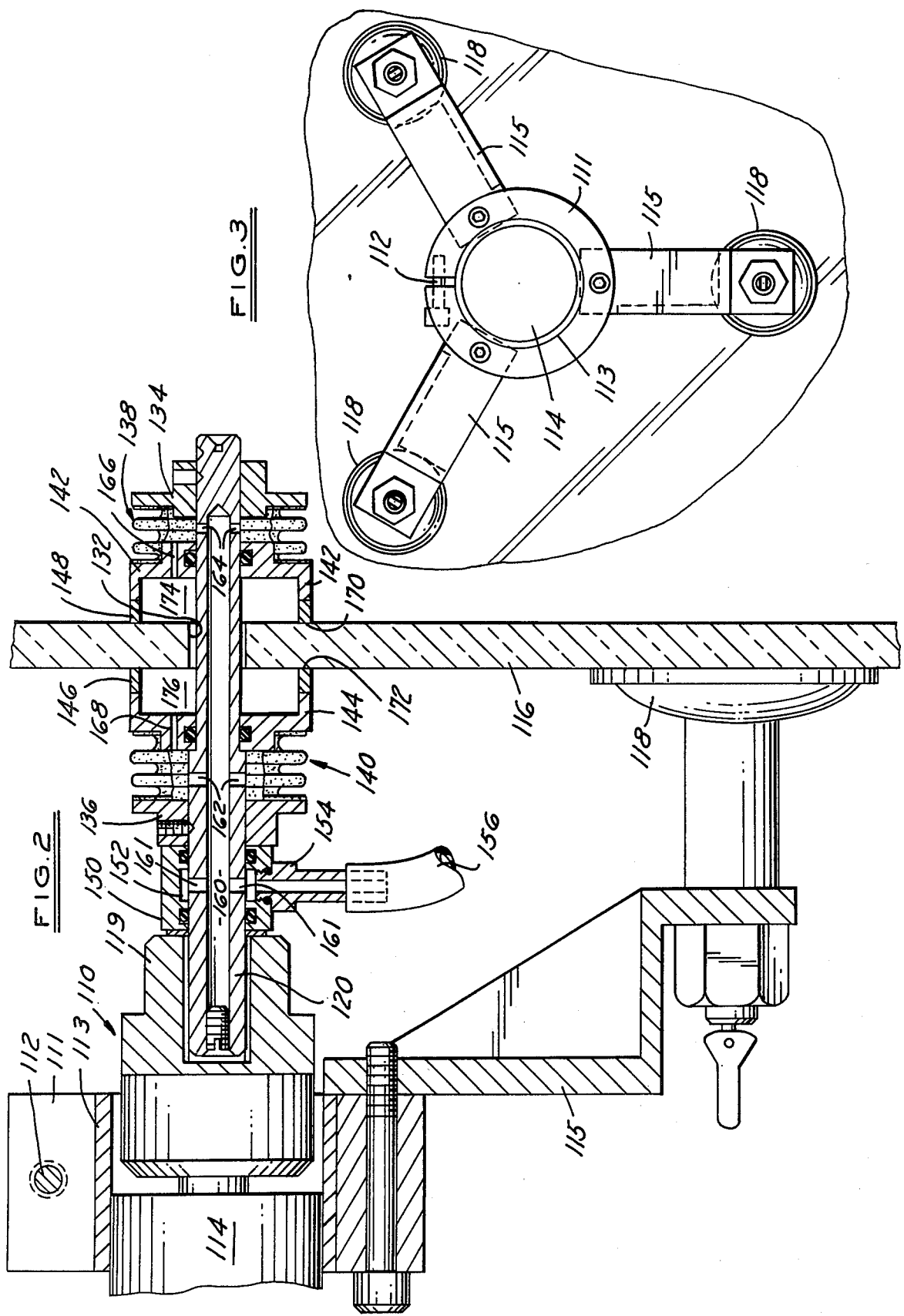

CONSTANT FORCE SHEET GLASS CUTTING DRILL ASSEMBLY

This invention relates to an apparatus for cutting through the surface of a sheet of plate glass or the like and is an improvement over the glass cutting apparatus shown and described in my copending United States patent application Ser. No. 819,904, Portable Core Drill Cutter for Hard Brittle Sheets, filed July 28, 1977.

The art of core drilling has not changed essentially since its beginning. The core drill usually is rotated in a drill press with water flushing the core drill face. When an uncontrolled manual force is applied to the cutting face against the brittle material being cut, excessive heat can be generated causing minute flaws in most materials. The abrasive core drill wear life also is shortened.

It is a primary object of this invention to provide a glass cutting apparatus that is essentially automatic in operation and always applies essentially a constant cutting force against the glass through the use of the flushing liquid used to wash away the grinding swarf.

It is another object of this invention to provide a portable glass hole cutting apparatus of the type described in which core drill cuters are aligned on opposite sides of the glass and driven simultaneously with constant forces applied to the cutters by application of the flushing fluid against each of the core drills, the force being controlled by leakage of the fluid into the interior of the core drills at a controlled rate and out past the cutter faces to providea self-regulating action.

The apparatus of my copending application Ser. No. 819,904, referred to above, as well as U.S. Pat. No. 4,073,094, Method and Apparatus for Repairing a Crack in a Pane of Plate Glass, Walz, each provide an essentially automatic cutting of a hole through a sheet of plate glass by means of the simultaneous cutting through opposite surfaces of the glass at the same time. However, both of these apparatii utilize a spring as the power or biasing cutting force, with a water supply directed from inside out of the cutting faces to wash away the grinding swarf. Thus, the cutting forces and washing fluid are totally independent of one another.

In the present invention, the washing fluid flushes away the grinding swarf to maintain the cutting faces clean and reduce the load of the core drills. The washing fluid also is used as an actuating force against the core drill cutters to bias the cutting faces against the glass. Thus, there is an interaction between the drilling force and the flushing action to provide a constant metered cutting force that is self-regulating by a floating action of the core drill in a manner to be described.

The closest prior art of which I am aware other than that cited in my copending Ser. No. 819,904 and as references of record in U.S. Pat. No. 4,073,094 referred to above, is U.S. Pat. No. 3,813,820, Highberg et al, Sheet Glass Core Drilling Machine. The latter shows in FIG. 1 a pair of core drills located on opposite sides of a glass specimen to be cut and alternately movable into cutting engagement with the glass by means of a pair of tools 33 that are alternately reciprocated into position by a piston apparatus 27. In this case, the whole tool holder, etc., is movable by a fluid pressure device and the core drills are not operated simultaneously to simultaneously cut a hole through opposite sides of the glass without relative rotation to one another.

In this invention, in one embodiment, fluid under pressure is applied between the core drill cutter and the drill shaft by means of a flexible bellows that expands or contracts with changes in pressure level, and a leak-down orifice is provided through the base of the core drill cutter which permits the fluid under pressure to flow into the interior of the core drill and radially outwardly past the core drill cutter face to flush away the grinding swarf. The leak-down passage constitutes a first or primary orifice providing a pressure differential that establishes a higher pressure level acting on the core drill to force it into the glass surface. The space between the cutter face and the glass surface acts as a secondary orifice that varies in size with swarf build-up and lubricating fluid pressure, thus causing the pressure inside of the core drill to vary and change the pressure differential across the core drill. This results in a self-regulating axial movement of the core drill and the bellows to always maintain an equilibrium position of the core drill thereby maintaining an essentially constant cutting force against the glass surface even though the pressure of the flushing fluid may vary.

It is a still further object of the invention, therefore, to provide a glass cutting apparatus of the type described that utilizes the lubricating fluid, which may be at any of several pressure levels, as the actuating means to force the core drill cutter into the surface of the glass to be cut with a constant force while simultaneously flushing away the grinding swarf to prevent a heat build-up that would reduce the cutting action.

Other objects, features and advantages of the invention will become more apparent upon reference to the succeeding detailed description thereof, and to the drawings illustrating the preferred embodiments thereof; wherein, FIG. 1 is a side elevational view, with parts broken away and in section, of a glass cutting apparatus embodying the invention;

FIG. 2 is a cross-sectional view, with parts broken away and in section, of a portable glass cutting apparatus that simultaneously cuts opposite sides of a glass; and, FIG. 3 is a plan view of the FIG. 2 embodiment.

FIG. 1 shows a core drill assembly 10 that is mounted in a conventional drill press stand 12. The stand has the usual base plate 14 and a vertically adjustable holder 16. Within the holder is fixed a drill chuck 18 into which is fixedly mounted a hat-shaped drill shaft 20. The shaft has a central fluid passage 22 that is aligned with and intersects a similar fluid passage 24 provided in a core drill cutter mount stud 26. The stud extends down beyond the annular flanged end 28 of shaft 20 and at its upper end is press fitted within a recess 30 in shaft 20. Passage 24 terminates as shown at a number of circumferentially spaced fluid discharge holes 32 through the wall of stud 26, for a purpose to be described.

The upper end of fluid passage 22 in shaft 20 is plugged as shown. A member of circumferentially spaced fluid inlet holes 34 extend through the wall of shaft 20 to intersect and connect passage 22 to a fluid annulus 36. The latter is provided in a water or fluid connector 38 that is sealingly secured on shaft 20, as shown. Annulus 36 is connected via a tube 40 to a variable pressure source of fluid, such as water, for example, that may vary from 10 to 80 psi.

The lower stem end of stud 26 extends through a piston type core cutter 42 that is slidably and sealingly mounted on stud 26. Preferably, the cutter would have a diamond annulus cutter face 44 for engagement with a sheet of plate glass or the like 46 to be drilled. A stop ring 47 is secured to stud 26 to be drilled. A stop ring 47 is secured to stud 26 to limit the lower movement of core cutter 42.

The lower surface of the flange 28 of shaft 20 and the upper surface 48 of core cutter 42 are sealingly connected as by soldering to opposite ends of an annular flexible hollow sheet metal bellows 50. The bellows is of slightly smaller diameter than the core cutter. The interior 51 of the bellows is adapted to be filled with fluid supplied from shaft 20 through holes 32. The bellows contracts and expands, in a manner to be described, to vertically bias the core cutter 42 into cutting engagement with glass 46 with an essentially constant force.

The cutter core has a leak-down orifice 52 of a controlled area providing a pressure differential across it. The space 54 that is defined between the diamond cutter face 44 and the glass surface 46 being cut constitutes a second controlled area orifice. The fluid or water inside the core cutter 42 passes outwardly through orifice 54 to wash away the grinding swarf to maintain the cutting surface clean and also prevent loading of the cutter face.

In operation, it is the lubricating fluid, i.e., water, in passage 20 that supplies the force for moving the cutter 42 into the glass to cut the glass, and it is the two orifices 52 and 54 that regulate the cutting force. Water is supplied under pressure to bellows 50 through shaft holes 32. The water slowly exits through orifice 52 causing a backpressure in bellows chamber 51. It is this backpressure that urges the cutter 42 downwardly into cutting engagement with glass 46. The pressure in bellows chamber 51 will always be greater than in cutter chamber 58 because the water exits chamber 58 through the grinding space 54 between the teeth of the cutter and the glass.

It will be clear that the cutting force on the glass is self-regulating. As the backpressure in bellows chamber 51 increases, the size of orifice 54 decreases. The size of orifice 54 also may decrease with grinding swarf build-up. The builds up the pressure in cutter chamber 58 to oppose the bellows chamber force and urge the cutter upwardly or away from the glass. Thus, the cutter reciprocates back and forth seeking an equilibrium position applying essentially a constant force to the cutter. The cutter 42 is free to slide vertically on the stud 26, which permits the bellows to expand and contract.

FIGS. 2 and 3 show a modified construction for simultaneously cutting a hole through opposite sides of a piece of plate glass with a constant and equal force on both cutters. In this case, the drill assembly is portable and can be mounted directly against the glass to be cut. As in FIG. 1, there is shown a core drill mount assembly 110 that includes a two-piece or split collar 111 that can be clamped by a bolt 112 around a sleeve 113. The sleeve is press fitted to a drill motor partially indicated at 114. The drill mount assembly further includes three equally circumferentially spaced mounting legs 115 that are bolted to the collar 111 by the bolt shown. They extend as seen in FIGS. 2 and 3 both laterally and diagonally in a dome-like shape from the collar to space it from the glass specimen 116 to be repaired. A quick disconnect type suction cup 118 is fixed to the end of each mounting leg 115 and detachably mounts the drill assembly onto the glass as indicated to straddle a hole or opening to be repaired.

The drill motor 114 includes a chuck 119 into which is fixedly mounted a drill shaft 120. The shaft extends, as shown in FIG. 2, through a hole 132 in glass 116 that would first be drilled to accommodate the drill shaft if the hole to be repaired is of a smaller diameter. This would occur, for example, if the hole to be repaired were caused by beebees or other shot of similar size.

Keyed to shaft 120 on opposite sides of the glass are flanges 134 and 136, to each of which are soldered one end of an annular flexible metal bellows 138, 140. The opposite end of each bellows is soldered to the base of a hollow cup-shaped core drill cutter 142, 144 having an annular sintered diamond cutting face 146, 148. As shown, each cutter is of slightly larger diameter than the contiguous bellows, and is slidably mounted on the shaft 120 for an axial sliding movement to provide a continuous progressive cutting into the glass. The flexibility of each bellows permits the axial sliding movement and transmits the torque of the shaft to the cutter by means of the mounting flanges 136, 138 so that both cutters rotate simultaneously with the shaft 120 and do not rotate relative to one another. This provides a smooth breakthrough of the cutters.

Similar to the FIG. 1 showing, the upper end of shaft 120 is surrounded by a rotary seal 150. It has an annulus 152 connected by a disconnect adapter 154 to a supply of lubricating fluid, water in this case, at variable pressures through a flexible tube 156. The annulus 150 connects the water to a central passage 160 in shaft 120 through a pair of inlet passages 161 for delivery through a first set of radial discharge passages or ports 162 to the interior of bellows 140, and a second set of discharge passages or ports 164 for delivery of the water to the interior of the bellows 138. A primary fluid flow controlling leak-down orifice 166, 168 of controlled area is provided through the base of each cutter 142, 144 to connect the water from the bellows to the cutter interior at a controlled rate. Again, as in FIG. 1, a secondary orifice 170, 172 of controlled area is defined by the space between the cutter teeth and the surface of the glass being cut.

The operation of the FIG. 3 embodiment is similar to that of the FIG. 1 showing. In operation, the portable drill assembly, with the drill motor clamped in place, would be transported to the site of the glass to be repaired and mounted against the glass. A pilot hole of a diameter slightly larger than the drill shaft 120 would first be drilled if the hole is not already of such a diameter. Drill shaft 120 would then be inserted through the glass with the near side flange 136, metal bellows 140 and core drill cutter 144 already assembled thereto leaving only the opposite side to be assembled. The water would be connected to adapter 156 and the drill motor 114 started at a slow rpm. The water under pressure applied to the central passage 160 fills the bellows 138 and 140 and is discharged into the interior of the cutters through the primary set of orifices 166 and 168. The pressure drop caused across these orifices provides a backpressure in each of the bellows chambers thereby causing the bellows to expand by the cutters 142 and 144 moving axially towards the glass under the force of the backpressure. It will be clear that equal cutting forces will exist on both the cutters 142 and 144 because of the communication of the water with both bellows. The cutting force is constant and self-regulating in that the secondary orifices 170, 172 vary in area according to the grinding swarf build-up or the change in inlet fluid pressure. That is, if the secondary orifices become smaller, then the backpressure in the cutter chambers 174, 176 increases, decreasing the pressure differential across the primary orifices 166, 168 and decreasing the net force acting against the base of the cutters 142, 144.

The net result is that the cutters move slightly away from the glass surface until an equilibrium position is attained again providing the desired force on the cutting surface.

From the foregoing, it will be seen that the invention provides a glass cutting drill assembly that can be easily transported to the work upon which repair is to be made and that a hole can be quickly drilled because of the simultaneous rotation at the same speed of cutters on opposite sides of the glass with equal forces on the glass surfaces. The locking of the two cutters together prevents relative rotation between the two so that when a breakthrough of the glass is made there is no cutting of the faces upon each other. A typical example of operation of a device of this kind would be to rotate the drill motor at 200-300 rpm with 10-80 psi water pressure. Using this, it would take approximately 30 seconds to cut a hole through a quarter inch plate glass.

While the invention has been shown and described in its preferred embodiments, it will be clear to those skilled in the arts to which it pertains that many changes and modifications may be made thereto without departing from the scope of the invention.

I claim:

1. A portable, lightweight drill assembly for drilling through the surface of a piece of plate glass or the like, comprising, in combination, means for detachably mounting a drill motor or one side of the glass, the motor having a drill shaft mounted thereon, a core drill having a cutter face engageable with the glass, means operatively mounting the core drill on the drill shaft and operatively connecting the core drill to the shaft for simultaneous rotation together while permitting axial movement of the core drill relative to the shaft, fluid pressure means acting between the core drill and the shaft yieldably biasing the cutter face of the core drill against the glass surface whereby operation of the drill motor effects a simultaneous rotational and axial cutting movement of the core drill through the surface of the glass, the fluid pressure means including a source of fluid at variable pressure, and means maintaining a constant force on the core cutter face regardless of the change in pressure level of the fluid.

2. A drill assembly as in claim 1, including an expandable-contractible bellows rotationally connecting the core drill cutter and drill shaft, and means connecting the fluid pressure source to the inside of the bellows for biasing the core drill cutter against the glass.

3. A drill assembly as in claim 2, the core cutter having a flow restricted passage for discharging the fluid from the bellows at a controlled rate into the interior of the core drill cutter for a controlled discharge past the cutter face.

4. A drill assembly as in claim 2, including an orifice through the core drill providing a controlled leak-down rate of the fluid in the bellows into the interior of the core drill and past the core drill cutter face to provide a self-regulating action to maintain the force on the cutter face constant.

5. A drill assembly as in claim 1, including a fluid passage through the drill connected at one end to a source of fluid at variable pressure, the passage at its other end opening adjacent the core drill to act thereagainst, an orifice through the core drill admitting a controlled flow of fluid internally of the cutter faces for discharge radially outwardly under pressure past the cutter face of the core drill to continuously flush grinding swarf away from the cutter and thereby minimize loading of the drill.

6. A drill assembly as in claim 5, including flexible bellows means rotationally connecting the shaft and core drill, the fluid passage discharging into the bellows for an axial expansion or contraction of the bellows upon changes in pressure conditions on the core drill interior side of the orifice to maintain a constant force on the cutter face regardless of fluid pressure changes.

7. A portable lightweight drill assembly for penetrating the surface of a sheet of plate glass or the like comprising a rotatable drill motor shaft, a core drill axially slidably mounted on the shaft, a flexible bellows axially aligned with the shaft and core drill and sealingly and rotationally connecting the shaft and core drill with an axial space between, the core drill being essentially cup-shaped in cross-section having a base portion connected to the bellows and a projecting portion having a peripheral edge defining a cutter face, the two portions together defining a hollow interior facing the glass surface, a fluid passage through the drill shaft opening into the interior of the bellows for applying fluid pressure to the core drill biasing the cutter face into the glass, a flow restricting leak-down orifice through the base of the core drill connecting the fluid under pressure in the bellows to the interior of the core drill for discharge therefrom under pressure between the glass surface being cut and the cutter face of the core drill to continuously flush grinding swarf away from the face, the pressure differential across the orifice controlling an axial flexing of the bellows and axial movement of the core drill to maintain a constant cutting force on the cutter face, and means connecting the fluid passage to a source of variable pressure.

8. A drill assembly as in claim 7, including stop means on the shaft in the path of movement of the core drill to limit the depth of penetration of the cutter face into the glass.

9. A portable, lightweight drill assembly for enlarging a hole or opening in a piece of plate glass or the like, comprising, in combination, means for detachably mounting a drill motor on one side of the glass, the motor having a drill shaft extending through the glass from one side to the other through a hole of a diameter accommodating the shaft and coaxial with the opening to be enlarged, a pair of core drills facing one another one each on opposite sides of the glass and having cutter faces of a larger diameter than the hole in the glass, means operatively connecting the core drills to the drill shaft for simultaneous rotation therewith, the faces of the core drills being contiguous to opposite glass surfaces, means mounting each of the core drills on the shaft for an axial movement relative to the shaft, fluid pressure means acting between the shaft and each core drill biasing the cutter faces of the core drills against the contiguous glass surfaces with the same force whereby operation of the drill motor effects a simultaneous rotational cutting by the pair of core drills into opposite surfaces of the glass by the simultaneous axial movement of the drills in opposite directions towards one another to provide the desired enlarged hole, a flexible bellows sealingly and rotationally connecting the shaft to each core drill, and means connecting the fluid pressure means to the interior of the bellows for axially biasing the core drills against the glass.

10. A drill assembly as in claim 9, the fluid pressure means including a fluid passage through the shaft connected at one end to a source of fluid under variable pressure, the passage at its other end opening into each bellows, an orifice through each core drill connecting the fluid under pressure internal of the cutter faces for discharge therefrom radially outwardly under pressure past the cutter faces of the core drills to continuously flush grinding swarf away from the cutters and thereby minimize loading of the drills while simultaneously regulating the axial movement of the core drills and bellows as a function of the backpressure buildup in the interior of the core drills to provide a constant force action on the cutter faces.

11. A drill assembly as in claim 9, each of the bellows being of an external diameter slightly less than the diameter of the core drill.

12. A drill assembly as in claim 9, including a bellows torque transmitting mounting flange means fixed to the shaft on opposite sides of the glass, and means fixing one end of the adjacent bellows to the respective flange means.

13. A drill assembly as in claim 10, the core drill comprising a cup-shaped member in cross-section having a base portion fixed to the bellows and a projecting portion with a peripheral edge cutting face, the orifice extending through the base portion to connect the interior of the bellows to the interior of the core drill.

14. A portable lightweight drill assembly for cutting a hole in a sheet of plate glass comprising a drill motor fixedly mounted in a drill holder detachably secured against the glass, a pair of core drills axially slidably mounted on the shaft each on an opposite side of the glass, a flexible bellows sealingly connecting each core drill to portions of the shaft for transmitting rotation of the shaft simultaneously to both of the drills, and a source of fluid under pressure for flushing the grinding swarf away from the core drills cutting faces connected to the interior of the bellows to act on and bias the core drills into simultaneous cutting engagement with the glass with the same force, the core drills have a fluid leak-down orifice of controlled area connecting the interiors of the bellows and core drills, the fluid discharging under pressure radially outwardly past the drill cutter faces flushing grinding swarf away from the cutter face while simultaneously providing a self-pressure regulating axial movement of the bellows and core drills as a function of the backpressure build-up in the interior of the core drills upon swarf build-up at the cutter faces, to maintain a constant cutting force on the cutter faces regardless of the change in pressure of the fluid or the change in differential pressure across the leak-down orifice.

* * * * *